(12) United States Patent
Sack

(10) Patent No.: US 9,985,427 B2
(45) Date of Patent: May 29, 2018

(54) ELECTRONIC CIRCUIT

(71) Applicant: ECOM Instruments GmbH, Assamstadt (DE)

(72) Inventor: Norbert Sack, Lauda-Koenigshofen (DE)

(73) Assignee: ECOM INSTRUMENTS GMBH (DE)

(*) Notice: Subject to any disclaimer, the term of this patent is extended or adjusted under 35 U.S.C. 154(b) by 754 days.

(21) Appl. No.: 14/502,298

(22) Filed: Sep. 30, 2014

(65) Prior Publication Data
US 2015/0092310 A1 Apr. 2, 2015

(30) Foreign Application Priority Data

Oct. 1, 2013 (DE) .................. 10 2013 219 950

(51) Int. Cl.
| H02H 7/18 | (2006.01) |
| H02J 7/00 | (2006.01) |
| H02H 3/06 | (2006.01) |
| H02H 3/05 | (2006.01) |
| H02H 3/08 | (2006.01) |
| H02H 9/00 | (2006.01) |

(52) U.S. Cl.
CPC ............... *H02H 7/18* (2013.01); *H02H 3/05* (2013.01); *H02H 3/06* (2013.01); *H02H 3/08* (2013.01); *H02H 9/008* (2013.01); *H02J 7/0031* (2013.01); *H02J 7/0036* (2013.01)

(58) Field of Classification Search
CPC ... H02H 7/18; H02J 2007/0039; H02J 7/0036
See application file for complete search history.

(56) References Cited

U.S. PATENT DOCUMENTS 5,397,974 A * 3/1995 Tamai .................. H02J 7/0031
320/164
5,631,537 A * 5/1997 Armstrong .............. G05F 3/242
320/116

(Continued)

FOREIGN PATENT DOCUMENTS

DE 10103336 C1 12/2002
DE 102012200872 A1 7/2013

(Continued)

OTHER PUBLICATIONS

European Search Report for EP-14187314.1, dated Mar. 18, 2015.
English abstract for DE-102012200872.
German Office Action for DE-102013219950.3, dated Jun. 11, 2014.

*Primary Examiner* — Thienvu Tran
*Assistant Examiner* — Christopher Clark
(74) *Attorney, Agent, or Firm* — Fishman Stewart PLLC

(57) ABSTRACT

An electronic circuit arrangement may include a first and a second electrical supply line for connecting an electronic device with a rechargeable battery. The first electrical supply line may be connected at one end with the rechargeable electric battery and at the other end with the electronic device for supplying electric energy. At least two switching elements may be provided in the first electrical supply line, which each may be switchable between an open state, in which the respective switching element electrically interrupts the first supply line, and a closed state. The electronic circuit arrangement may include a protective circuit arrangement and a reset circuit arrangement.

20 Claims, 1 Drawing Sheet

(56) References Cited

U.S. PATENT DOCUMENTS

| | | | | |
|---|---|---|---|---|
| 5,818,201 A * | 10/1998 | Stockstad | ............ | H02J 7/0016 320/116 |
| 6,492,791 B1 * | 12/2002 | Saeki | ................. | H01M 10/425 320/118 |
| 6,710,992 B2 | 3/2004 | Pannwitz et al. | | |
| 6,879,133 B1 * | 4/2005 | Geren | ................... | H02J 7/0031 320/134 |
| 7,041,400 B2 * | 5/2006 | Kim | ................. | H01M 10/4257 429/61 |
| 2009/0273314 A1 * | 11/2009 | Yoshikawa | ......... | H01M 2/1016 320/134 |
| 2010/0129700 A1 * | 5/2010 | Tanno | ................ | H01M 10/441 429/93 |
| 2011/0273804 A1 * | 11/2011 | Ikeuchi | ................ | H02J 7/0031 361/63 |
| 2013/0229145 A1 * | 9/2013 | Alessandro | ........... | H02J 7/0052 320/107 |

FOREIGN PATENT DOCUMENTS

| | | | |
|---|---|---|---|
| EP | 222381 | A2 | 5/1987 |
| EP | 2557581 | A1 | 2/2013 |

* cited by examiner

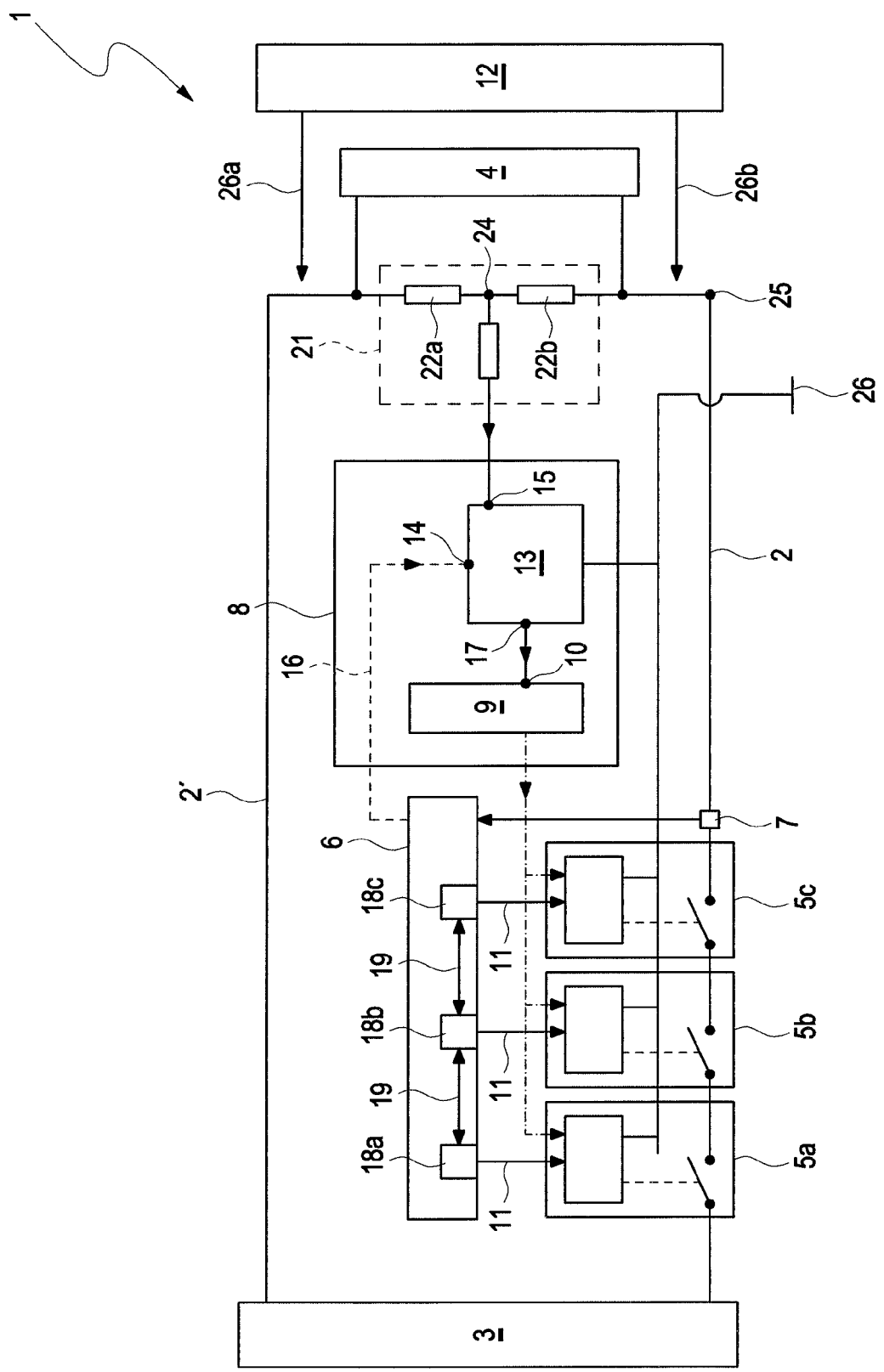

ELECTRONIC CIRCUIT

CROSS-REFERENCE TO RELATED APPLICATIONS

This application claims priority to German Patent Application No. DE 102013219950.3, filed Oct. 1, 2013, the contents of which are hereby incorporated by reference in their entirety.

TECHNICAL FIELD

The present invention relates to an electronic circuit arrangement for use in a potentially explosive atmosphere as well as a process for operating an electronic device by means of such an electronic circuit arrangement.

BACKGROUND

Portable electronic devices for use in a potentially explosive atmosphere such as on a drilling rig or similar, include for example electronic circuits with so-called electronic protective circuits, which in case of a malfunction, e.g. of the kind of an electric short-circuit, interrupt the electrical connection between a rechargeable battery supplying the electronic device with electrical energy and the electronic device itself. To this end a circuit element, e.g. of the kind of a semiconductor switch, may be provided in the circuit arrangement for interrupting the connection between the battery and the electronic device. Such electronic circuits, however, must be configured such that after clearing the malfunction the electric isolation between battery and electronic device is cancelled.

SUMMARY

The present invention therefore addresses the problem of finding new solutions in the development of electronic circuit arrangements for electronic devices for use in potentially explosive atmospheres.

This requirement is met by the subject of the independent patent claims. Preferred embodiments are the subject of the dependent patent claims.

The circuit arrangement according to the invention comprises a protective circuit arrangement on the one hand, by means of which the electrical connection between a battery and the electronic device to be supplied with energy can be interrupted in case of an error condition, and on the other, comprises a reset circuit arrangement by means of which the interruption of the electrical connection between battery and electronic device can be cancelled. Due to the inventive functional isolation between protective circuit arrangement and reset circuit arrangement the operational safety of the circuit arrangement presented here in relation to conventional circuit arrangements is distinctly improved.

The electronic circuit arrangement according to the invention which is proposed here, comprises a first electrical supply line for connecting an electronic device with a rechargeable battery wherein the electrical supply unit is connected at one end with the rechargeable electric battery and at the other end can be, or is connected with the electronic device for supplying the device with electrical energy. In the first electrical supply line at least two switching elements, in the form of e.g. semiconductor switches, are provided which can each be switched between an open state—the so-called locked state—in which the respective switching element electrically interrupts the first supply line, and a closed state—the so-called conductive state. In the opened state of at least one switching element therefore, the energy supply of the electronic device with energy from the rechargeable battery is interrupted.

The circuit arrangement according to the invention includes a protective circuit arrangement which in case of a malfunction switches over at least two of the switching elements in the rechargeable battery and/or in the electronic device so that the electric current flow is interrupted by the first electrical supply line. This electrical interruption of the first electrical supply line caused by the protective circuit arrangement can be cancelled by means of a reset circuit arrangement provided in the electronic circuit arrangement, the reset circuit arrangement being configured such that in the electrically interrupted state of the first electrical supply line, when the electronic device is connected to an external charging device, it switches all switching elements over into the closed state. This means that the connection of the electronic device to the external charging device for charging the battery is used as a "trigger" by the protective circuit arrangement for resetting the switching elements into the opened state.

With a preferred embodiment both the protective circuit arrangement and the reset circuit arrangement are connected to a common electric mass potential. In particular due to this operational safety, any restrictive potential differences between reset circuit arrangement and protective circuit arrangement can be avoided. For if there are any potential differences in the mass potentials between protective circuit arrangement and reset circuit arrangement, this may lead, particular in a case where the battery is partially or completely discharged, to the electrical energy provided by the battery being no longer sufficient for supplying enough electrical energy to the components so that these can no longer function properly.

With another preferred embodiment the protective circuit arrangement comprises an electric current sensor provided in the first electrical supply line, by means of which the electric current flowing through the electrical supply line can be determined. With this arrangement the protective circuit arrangement cooperates with the electric current sensor and the at least two switching elements in such a way that when a predetermined threshold current ascertained by means of the electric current sensor is exceeded, it switches the at least two switching elements respectively into the opened state, so that the electric current flowing through the first electrical supply line is interrupted. It is obvious that to do this in principle only one of the two series-connected electrical switching elements needs to be switched over; for redundancy reasons and for increasing operational safety of the electronic circuit arrangement, in particular for use in a potentially explosive atmosphere, however, all switching elements provided in the electrical supply line, i.e. at least two switching elements, are switched over into the opened state.

According to an advantageous further development the reset circuit arrangement may comprise a first partial circuit arrangement, which on the input side comprises an electrical signal connection and on the output side is connected with the at least two switching elements respectively and cooperates with the same in such a way that when a reset signal is applied to the signal connection on the input side, it switches the at least two switching elements over into the closed state. The first partial circuit arrangement, as part of the reset circuit arrangement, is therefore connected to the same electric mass potential as the protective circuit arrangement which further improves its operational safety.

The first partial circuit arrangement may be realised like a conventional circuit with different analogue electronic components such as transistors, resistances, capacities etc. but may also be supplemented with logic gates, microprocessors and integrated circuits (IC).

It is particularly convenient if the reset circuit arrangement comprises a second partial circuit arrangement, which comprises an output connection and first and second input connections. Depending on the states of the two input connections a certain electrical output signal is generated at the output connection. The output connection of the partial circuit arrangement, for controlling the two switching elements, is electrically connected with the signal connection of the previously presented first partial circuit arrangement. The first input connection of the second partial circuit arrangement is coupled with the at least two switching elements in such a way that a first activation signal is provided at the first input connection when at least one of the switching elements is in the opened state, In this way the second partial circuit arrangement is able to detect whether the protective circuit arrangement is already activated and has provided for an interruption of the electrical connection between the rechargeable battery and the electronic device. By means of the second partial circuit arrangement the reset circuit arrangement can thus be "primed" to reset the switching elements into the closed state.

The second input connection is coupled respectively with the electrical supply line in such a way that when the electronic device is connected to the external charging device, a second activation signal is provided. This allows the second partial circuit arrangement to ascertain that the electronic device which after being isolated from the battery is now in a state in which it is no longer supplied with electrical energy, can again be supplied with energy by being connected to the charging device and can be reset. Following such a reset of the electronic device it can again be connected with the battery via the electronic circuit arrangement. To this end the electrical connection between the electronic device and the battery which was interrupted by the protective circuit arrangement must be restored by switching the switching element over into the closed state. To this end the second partial circuit arrangement is configured in such a way that, when the first and second activation signals are provided at the two input connections, it generates the said reset signal at the output connection.

A simplified manufacture and flexible possibilities of use result if the protective circuit arrangement also comprises separate control units associated respectively with each of the switching elements. The control unit may be part of the second partial circuit arrangement, wherein each control unit uses the protective circuit arrangement to switch the switching element associated with it into the opened state if it is ascertained that the predetermined threshold current in the electrical supply line has been exceeded. According to this embodiment the protective circuit arrangement may, especially preferably, comprise a coupling unit which couples the at least two control units to each other in such a way that for a switch-over of the respective switching element into the opened state by the control unit associated with the switching element, the at least one remaining control unit is controlled by means of the coupling unit in such a way that this switches the switching element associated with the at least one remaining control unit also into the opened state at a time delay. In this way it is prevented that a switching element already switched over into the opened state due to unwanted electrical coupling effects between the switching elements/associated control units is again switched over in an unwanted manner into the opened state.

Preferably the electrical supply line may be connected by means of a voltage divider arrangement with a second supply line of the rechargeable battery. The voltage divider arrangement may comprise an electrical series connection arrangement with a first and a second electric resistance, wherein a connection element is provided between the two electric resistances which is connected electrically with the second input connection. In case the electronic device is connected to the external charging device, the voltage divider arrangement acts in such a way that a low-voltage signal is present at the second input connection. This is interpreted by the second partial circuit arrangement as a reset signal for switching the switching elements over into the opened state. For in the case that in the opened state of the two switching elements no external charging device is connected to the electronic device and thus to the electronic circuit arrangement, the second electric resistance, due to the interrupted first electrical supply line, does not comprise a defined electric potential. In this case no electric voltage drop occurs at the second electric resistance between connection element?. However, as soon as the external charging device is connected to the two supply lines, an electric current can flow through the two resistances so that on these, in terms of a voltage divider corresponding to their dimensioning, a respective electric partial voltage drop occurs which leads to a lowering of the electric potential at the connection point between the two resistances. Connecting the electronic device with the two supply lines thus leads to a reduction of the electric potential at the connection point from a "high" level to a "low" level as soon as the external charging device is connected with the two supply lines.

Preferably the first electric resistance may be 1 MΩ and the second electric resistance may be 1 kΩ. It goes without saying that other suitable values may be used in variants.

For a further improvement in operational safety of the electronic circuit arrangement exactly three electrical series-connected switching elements may be provided in the electrical supply line.

Especially preferably the at least two switching elements are configured as field effect transistors, wherein the first partial circuit arrangement is electrically connected with a gate connection of each field effect transistor for switching the field effect transistors between the closed and the opened state. The opened state of the switching element corresponds to a locked state of the field effect transistors, the closed state of the switching element corresponds to a conductive state.

The invention further relates to a method for operating an electronic device according to which an electronic circuit arrangement with an electrical supply line is provided for connecting an electronic device with a rechargeable battery, wherein the electrical supply line at one end is connected with the rechargeable electric battery and at the other end can be or is connected with the electronic device for supplying it with electric energy from the rechargeable battery. At least two switching elements are provided in the electrical supply line, wherein at least one of the switching elements is switched over into an opened state by means of a protective circuit arrangement if a predetermined electric threshold current in the electrical supply line is exceeded, and in this state the electrical supply line is interrupted. Now, according to the method, when the electronic device is connected to an external charging device, all switching elements are switched over into the closed state by means of a reset circuit arrangement which can be connected to the same electric mass potential as the protective circuit arrangement, and as a result the electrical interruption in the electrical supply line is cancelled.

Further important features and advantages of the invention are revealed in the sub-claims, in the drawing and in the associated description of the figures with reference to the drawing.

It is understood that the above-mentioned features and the features still to be explained below can be used not only in the respectively described combination but also in other combinations or on their own without deviating from the scope of the present invention.

Preferred exemplary embodiments of the invention are shown in the drawing and are explained in detail in the description below.

BRIEF DESCRIPTION OF THE DRAWINGS

FIG. 1 illustrates an electronic circuit arrangement according to one example.

DETAILED DESCRIPTION

FIG. 1 shows an electronic circuit arrangement according to the invention. The electronic circuit arrangement 1 comprises a first and a second electrical supply line 2, 2', by means of which a rechargeable battery 3 is connected via the electronic circuit arrangement 1 with an electronic device 4 for supplying this with electric energy from the battery 3. To this end the electrical supply line 2 is connected at one end with the rechargeable battery 3 and at the other end with the electronic device 4. To charge the battery 3 when needed, this can be connected via the supply lines 2, 2' with an external charging device 12.

At least two switching elements 5a, 5b, 5c are provided in the first electrical supply line 2 and these can be switched respectively between an opened state, in which the respective switching element 5a, 5b, 5c electrically interrupts the supply line, and a closed state, in which the electrical connection between the rechargeable battery 3 and the electronic device 4 is established. FIG. 1 shows three such switching elements 5a, 5b, 5c by way of example. These can be implemented as semiconductor components, for example in the form of field effect transistors. The opened state of a switching element 5a, 5b, 5c corresponds to a locked state of the transistor, the closed state of the switching element corresponds to a conductive state of the transistor.

The electronic circuit arrangement 1 comprises a protective circuit arrangement 6 which when an error condition in the rechargeable battery 3 and/or in the electronic device 4 occurs, switches the at least two switching elements into the schematically shown opened state so that the electric current flow through the electric supply line 2 is interrupted. To this end the protective circuit arrangement may comprise an electric current sensor 7 provided in the electrical supply line 2, by means of which the electric current flowing through the electrical supply line 2 can be determined. The protective circuit arrangement 6 cooperates with the electric current sensor 7 and the switching elements 5a, 5b, 5c in such a way that when a predetermined electric threshold current in the supply line 2 is exceeded, the switching elements 5a, 5b, 5c are switched over into the opened state, thereby completely interrupting the electric current flow through the electrical supply line 2. This has the effect of preventing the flow of inadmissibly high electric currents or the provision of excessively high electric energies in the two electrical supply lines 2, 2', which in a potentially explosive atmosphere brings with it the danger of a glow or spark ignition.

The protective circuit arrangement 6 is configured so as to interrupt an electrical connection between the battery 3 and the electronic device 4 also if a malfunction, such as a short-circuit, occurs in the electronic device 4, leading to an inadmissibly high electric current in the electrical supply line 2.

Now in order to reset the protective circuit arrangement 6 after remedying an error condition—such as an electrical short-circuit—in the electronic device 4 so that the electronic device 4 can again be supplied with electric energy from the battery 3, the electronic circuit arrangement 1 comprises a reset circuit arrangement 8. This cancels the electrically interrupted state of the first electrical supply line 2 as soon as the electronic device 4 is connected to an external charging device 12. To this end it switches the switching elements 5a, 5b, 5c again into the closed state. The reset circuit arrangement 8 and the protective circuit arrangement 6 are preferably connected to a common electric mass potential 26.

According to the technical realisation shown in FIG. 1 the reset circuit arrangement 8 may comprise a first partial circuit arrangement 9 which on the input side comprises an electrical signal connection 10 and on the output side is connected with the switching elements 5a, 5b, 5c via an electrical signal line 11 and cooperates with the same in such a way that the switching elements 5a, 5b, 5c, if a reset signal is present at the signal connection 10, are switched over into the closed state so that the electrical connection between the battery 3 and the electronic device 4 is re-established.

The reset signal for closing the switching elements 5a, 5b, 5c is generated by the first partial circuit arrangement 9 only if the switching elements 5a, 5b, 5c are in a closed state and the electronic device 4, in this state, is electrically connected to an external charging device 12. The necessary circuit logic is realised in a second partial circuit arrangement 13 of the reset circuit arrangement 8.

As can be recognised in detail in FIG. 1 the second partial circuit arrangement 13 has a first and a second input connection 14, 15. The first input connection 14 is coupled with the protective circuit arrangement 6 and indirectly coupled through this with the switching elements 5a, 5b, 5c such that a first activation signal is provided at the first input connection 14 if at least one of the switching elements 5a, 5b, 5c is in the opened state as is shown in FIG. 1. This means that an error condition has occurred either in the electronic device 4 or in the battery 3. In a simplified variant coupling of the first input connection 14 may alternatively be effected directly with the switching elements 5a, 5b, 5c via an appropriately designed signal line.

The second input connection 15 of the second partial circuit arrangement 13 is coupled with the electrical supply line 2 such that when the electronic device 4 is connected to the external charging device 12, a second activation signal is provided. To this end a circuit logic is realised in the second partial circuit arrangement 13, which generates the reset signal for switching the switching elements 5a, 5b, 5c over into the closed state only when both the first and the second activation signals are present. The reset signal is provided at an output connection 17 of the second partial circuit arrangement 13, which is electrically connected with the signal connection 10 of the first partial circuit arrangement 9 and, as already explained above, is processed further by the first partial circuit arrangement 9.

In order to detect that an external charging device 12 is connected to the electronic device 5, the electronic circuit arrangement 1 comprises a voltage divider circuit 21. The voltage divider circuit 21 generates the second activation signal at the second input connection 15, when the electronic device 4 is connected to the external charging device 12. To this end the voltage divider circuit 21 is realised in the form of an electric series connection with a first and second ohmic resistance 22a, 22b between the two supply lines 2, 2', wherein between the resistances 22a, 22b a connection element 24 is provided, which is electrically connected with the second input connection 15 of the second partial circuit arrangement 13. The first electric resistance 22a may for example be 1 MΩ, the second electric resistance 22b for example may be 1 kΩ. But it goes without saying that other suitable values are possible.

In case the protective circuit arrangement 6 has switched the switching elements 5a, 5b, 5c over into the opened state, the point marked 25 of the second electrical supply line is potential-free as long as the external charging device 12 is not connected with the electronic device 4 via the voltage divider circuit 21.

Consequently there is no electric voltage drop at the second electric resistance 22b, so that the whole of the supply voltage provided by the battery 3 via the supply line 2' is available at the second input connection 15 in the form of a "high-level" signal.

To charge the battery 3, the external charging device 12 may be connected via its two supply lines 26, 26b with the electrical supply lines 2, 2' or the electronic circuit arrangement 1. In this case point 25 also has a defined electric potential and a voltage drop occurs at the second ohmic resistance 22b so that the electric voltage level is reduced at the second input connection 15. Such a drop in the voltage level from a high-level signal to a low-level signal corresponds to the generation of the second activation signal at the second input connection 15 of the second partial circuit arrangement 13 of the reset circuit arrangement 8.

According to the embodiment shown in FIG. 1 the protective circuit arrangement 6 may comprises a separate control unit 18a, 18b, 18c for each of the switching elements 5a, 5b, 5c. Each control unit 18a, 18b, 18c switches its respectively associated switching element 5a, 5b, 5c into the opened state if the protective circuit arrangement 6 has ascertained that a predetermined threshold current has been exceeded in the electrical supply line 2. The protective circuit arrangement 6 may comprise a coupling device 19 which is schematically depicted by arrows in FIG. 1 marked with the reference symbol 19. The coupling device 19 couples the control units 18a, 18b, 18c with each other in such a way that when a certain switching element, for example the switching element 15a, is switched into the closed state by the control unit 18a associated with the switching element 15a, the remaining control units 18b, 18c are controlled by means of the coupling device 19 in such a way that these switch the switching elements 5b, 5c associated with the remaining control units 18b, 18c also into the closed state at a time delay. In this way any synchronisation problems during resetting the switching elements 5a, 5b, 5c can be controlled so as to prevent that the switching-over of one switching element, e.g. 5a, into the closed state leads to an unwanted switching-over of one of the two remaining switching elements, e.g. 5b, 5c which are already in the closed state, into the opened state.

The invention claimed is:

1. An electronic circuit arrangement for use in a potentially explosive atmosphere, comprising:

a first electrical supply line and a second electrical supply line for connecting an electronic device with a rechargeable battery, wherein the first electrical supply line is connected at one end with the rechargeable electric battery and at the other end with the electronic device for supplying electric energy;

at least two switching elements provided in the first electrical supply line, the at least two switching elements each being switchable between an open state, where the respective at least two switching elements electrically interrupt the first supply line, and a closed state;

a protective circuit arrangement, which if an error condition occurs in at least one of the rechargeable battery and the electronic device, the protective circuit arrangement switches the at least two switching elements into the opened state, so that the electric current flow through the first electrical supply line is interrupted;

a reset circuit arrangement configured such that in an electrically interrupted state of the first electrical supply line, when the electronic device is connected to an external charging device, the reset circuit arrangement switches the at least two switching elements into the closed state in response to a signal indicating an electrical connection is present between the electronic device and the external charging device so that the electrical interruption in the first electrical supply line is cancelled;

the reset circuit arrangement including a first partial circuit arrangement, the first partial circuit arrangement including an electric signal connection on an input side and electrically connected with the at least two switching elements on an output side, wherein the first, partial circuit arrangement is configured to cooperate with the at least two switching elements such that, if a reset signal is present at the electrical signal connection, the reset circuit arrangement switches the at least two switching elements into the closed state;

the reset circuit arrangement further including a second partial circuit arrangement, the second particular circuit arrangement including an output connection, a first input connection and a second input connection;

the output connection of the second partial circuit arrangement electrically connected with the electric signal connection of the first partial circuit arrangement;

the first input connection of the second partial circuit arrangement coupled with the at least two switching elements such that a first activation signal is provided at the first input connection if at least one of the at least two switching elements is in the opened state;

the second input connection of the second partial circuit arrangement coupled with the first electrical supply line such that when the electronic device is connected to the external charging device, a second activation signal is provided; and wherein the second partial circuit arrangement is configured such that when the first activation signal and the second activation signal are present at both of the first input connection and the second input connection, the reset signal is provided at the output connection.

2. The electronic circuit arrangement according to claim 1, wherein the reset circuit arrangement and the protective circuit arrangement are connected to a common electric mass potential.

3. The electronic circuit arrangement according to claim 1, wherein the protective circuit arrangement includes an electric current sensor provided in the first electrical supply line such that the electric current flowing through the first electrical supply line can be determined, and the protective circuit arrangement cooperates with the electric current sensor and the at least two switching elements such that if a predetermined electric threshold current ascertained via the electric current sensor is exceeded, the protective circuit arrangement switches the at least two switching elements into the opened state, so that the electric current flow through the first electrical supply line is interrupted.

4. The electronic circuit arrangement according to claim 3, wherein the protective circuit arrangement includes:

at least two separate control units for each of the switching elements, wherein each control unit switches the switching element associated with it into the opened state, when the protective circuit arrangement determines that the predetermined electric threshold current in the first electrical supply line has been exceeded, and a coupling device, which couples the at least two control units with each other such that when one switching element is switched into the opened state by the control unit associated with the switching element, the at least one remaining control unit is controlled via the coupling device to switch the switching element associated with the at least one remaining control unit also into the opened state at a time delay.

5. The electronic circuit arrangement according to claim 1, wherein the first electrical supply line is connected with the second supply line of the rechargeable battery via a voltage divider circuit, and the voltage divider circuit includes an electrical series connection with a first electrical resistance and a second electric resistance, wherein a connecting element is provided between the two electric resistances, which is electrically connected with the second input connection.

6. The electronic circuit arrangement according to claim 5, wherein the first electric resistance is 1 MOhm and the second electric resistance is 1 kOhm.

7. The electronic circuit arrangement according to claim 1, wherein exactly three electrical series-connected switching elements are provided in the first electrical supply line.

8. The electronic circuit arrangement according to claim 1, wherein the at least two switching elements are configured as field effect transistors, and the first partial circuit arrangement is configured to switch the field effect transistors between the opened and the closed state, and wherein the first partial circuit arrangement is connected electrically with a gate connection of each of the field effect transistors.

9. The electronic circuit arrangement according to claim 2, wherein exactly three electrical series-connected switching elements are provided in the first electrical supply line.

10. An electronic circuit arrangement for use in a potentially explosive atmosphere, comprising:

a first electrical supply line and a second electrical supply line for connecting an electronic device with a rechargeable battery, wherein the first electrical supply line is connected at one end with the rechargeable electric battery and at the other end with the electronic device for supplying electric energy;

at least two switching elements provided in the first electrical supply line, the at least two switching elements each being switchable between an open state, where the respective switching element electrically interrupts the first supply line, and a closed state;

a protective circuit arrangement, which if an error condition occurs in at least one of the rechargeable battery and the electronic device, the protective circuit arrangement switches the at least two switching elements into the opened state, so that the electric current flow through the electrical first supply line is interrupted;

a reset circuit arrangement configured such that in an electrically interrupted state of the first electrical supply line, when the electronic device is connected to an external charging device, the reset circuit arrangement switches the at least two switching elements into the closed state so that the electrical interruption in the first electrical supply line is cancelled;

the reset circuit arrangement including a first partial circuit arrangement, wherein the first partial circuit arrangement on an input side has an electric signal connection and on an output side is electrically connected and respectively cooperates with the at least two switching elements such that, if a reset signal is present at the electrical signal connection, the reset circuit arrangement switches the at least two switching elements into the closed state;

the reset circuit arrangement further including a second partial circuit arrangement, the second partial circuit arrangement including an output connection, a first input connection and a second input connection;

the output connection of the second partial circuit arrangement electrically connected with the electric signal connection of the first partial circuit arrangement;

the first input connection of the second partial circuit arrangement coupled with the at least two switching elements such that a first activation signal is provided at the first input connection if at least one of the switching elements is in the opened state;

the second input connection of the second partial circuit arrangement coupled with the first electrical supply line such that when the electronic device is connected to the external charging device, a second activation signal is provided; and wherein the second partial circuit arrangement is configured such that when the first activation signal and the second activation signal are present at both of the first input connection and the second input connection the reset signal is generated at the output connection.

11. The electronic circuit arrangement according to claim 10, wherein the protective circuit arrangement includes an electric current sensor provided in the first electrical supply line for sensing electric current flowing through the first electrical supply line, the protective circuit arrangement operatively connected with the electric current sensor and the at least two switching elements; and wherein the protective circuit arrangement is configured to switch the at least two switching elements into the opened state if a predetermined electric threshold current detected via the electric current sensor is exceeded, so that a flow of electric current through the first electrical supply line is interrupted.

12. The electronic circuit arrangement according to claim 11, wherein the protective circuit arrangement includes:

at least two separate control units associated with a respective one of the at least two switching elements, wherein each of the at least two separate control units switches the respective one of the at least two switching elements into the opened state when the predetermined electric current threshold is exceeded in the first electrical supply line; and a coupling device configured to couple the at least two separate control units with each other such that when one of the at least two switching elements is switched into the opened state by an associated one of the at least two control units, the at least one remaining control unit, is controlled via the coupling unit to switch the associated switching element into the opened state at a time delay.

13. The electronic circuit arrangement according to claim 10, further comprising a voltage divider circuit connecting the first electrical supply line with the second supply line, the voltage divider circuit including an electrical series connection with a first electric resistance and a second electric resistance, and a connecting element is provided between the first electric resistance and the second electric resistance, wherein the connecting element is electrically connected with the second input connection.

14. The electronic circuit arrangement according to claim 13, wherein the first electric resistance is 1 MOhm and the second electric resistance is 1 kOhm.

15. The electronic circuit arrangement according to claim 10, wherein the reset circuit arrangement and the protective circuit arrangement are connected to a common electric mass potential.

16. The electronic circuit arrangement according to claim 10, wherein exactly three electrical series-connected switching elements are provided in the first electrical supply line.

17. The electronic circuit arrangement according to claim 10, wherein the at least, two switching elements are configured as field effect transistors.

18. The electronic circuit arrangement according to claim 17, wherein the first partial circuit arrangement for switching the field effect transistors between the opened and the closed state is respectively connected electrically with a gate connection of the field effect transistors.

19. An electronic circuit arrangement for use in a potentially explosive atmosphere, comprising:
a an electronic device and a rechargeable battery;
a first electrical supply line and a second electrical supply line for connecting the electronic device with the rechargeable battery, wherein the first electrical supply line is connected at one end with the rechargeable electric battery and at the other end with the electronic device for supplying electric energy;
a voltage divider circuit connecting the first electrical supply line with the second electrical supply line;
at least two switching elements provided in the first electrical supply line, the at least two switching elements each being switchable between an open state that electrically interrupts the first supply line and a closed state;
a protective circuit arrangement configured to switch the at least two switching elements into the opened state if an error condition occurs in at least one of the rechargeable battery and the electronic device, so that the electric current flow through the electrical first supply line is interrupted;
a reset circuit arrangement configured such that in an electrically interrupted state of the first electrical supply line, when the electronic device is connected to an external charging device, the reset circuit arrangement switches the at least two switching elements into the closed state so that the electrical interruption in the first electrical supply line is cancelled, wherein the reset circuit arrangement includes a first partial circuit arrangement and a second partial circuit arrangement;
the first partial circuit arrangement on an input side having an electric signal connection and on an output side is electrically connected and cooperates with the at least two switching elements such that, if a reset signal is present at the electrical signal connection, the reset circuit arrangement switches the at least two switching elements into the closed state;
the second partial circuit arrangement including an output connection, a first input connection and a second input connection;
the output connection of the second partial circuit arrangement electrically connected with the electric signal connection of the first partial circuit arrangement;
the first input connection of the second partial circuit arrangement coupled with the at least two switching elements such that a first activation signal is provided at the first input connection if at least one of the at least two switching elements is in the opened state;
the second input connection of the second partial circuit arrangement coupled with the first electrical supply line such that when the electronic device is connected to the external charging device, a second activation signal is provided; and
wherein the second partial circuit arrangement is configured such that when the first activation signal and the second activation signal are present at both of the first input connection and the second input connection the reset signal is generated at the output connection.

20. The electronic circuit arrangement according to claim 19, wherein the voltage divider circuit includes an electrical series connection with a first ohmic resistance and a second ohmic resistance, and a connecting element provided between the first ohmic resistance and the second ohmic resistance, the connecting element electrically connected with the second input connection, and wherein the voltage divider circuit outputs the second activation signal at the second input connection when the electronic device is connected to the external charging device.

* * * * *